B. F. PRICE.
Stump Extractor.
No. 201,828. Patented March 26, 1878.
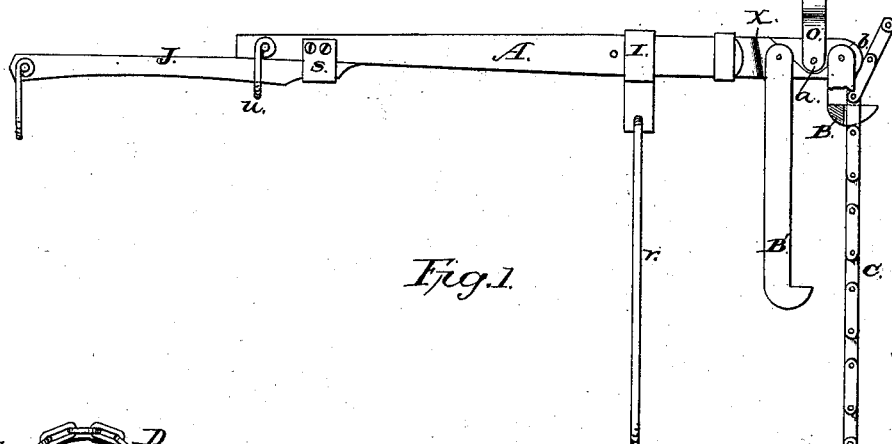

UNITED STATES PATENT OFFICE.

BENJAMIN F. PRICE, OF MOLINE, ILLINOIS.

IMPROVEMENT IN STUMP-EXTRACTORS.

Specification forming part of Letters Patent No. 201,828, dated March 26, 1878; application filed March 18, 1878.

*To all whom it may concern:*

Be it known that I, BENJ. F. PRICE, of Moline, in the county of Rock Island and State of Illinois, have invented a new and Improved Stump-Extractor; and I do hereby declare that the following is a full, clear, and exact description of the same, reference being had to the accompanying drawing, forming part of this specification, in which—

Figure 1 is a plan view of the apparatus. Fig. 2 is an enlarged detail side view of the end of the metal shank of the main lever, showing flanges at the end and recesses in the side for the fulcrum-clevis. Fig. 3 is an enlarged detail view of the spur-clevis. Fig. 4 is an enlarged sectional detail of the grab-chain showing the form of rivet-bolt. Fig. 5 are details of the tree-hook.

My invention relates to certain improvements upon that form of stump-puller in which a long lever is anchored upon one side to an immovable object, and has upon the opposite side and on both sides of its fulcrum a grab, which grabs, as the lever is oscillated by suitable power, alternately reach out and seize a chain, which is attached to the stump to be pulled.

My improvements consists, first, in the improved form and arrangement of the grabs, each of which is constructed in the shape of a claw, with one grab longer than the other, and both arranged to operate upon the same side of the grab-chain; second, in the arrangement of the grab-chain with rod-sections, links, and removable clevis, to facilitate the handling of the chain; third, in the construction and arrangement of a device for fastening the coil chain around the stump; fourth, in the construction and arrangement of a clevis, and connection for the fulcrum of the lever; fifth, in the arrangement of a sliding band or collar on the main lever, and a supplemental rod adapted to connect therewith to permit the more rapid removal of the stump after it is once started; sixth, in the peculiar arrangement of an additional section, to be applied to the end of the lever to increase its leverage when the power is not sufficient; seventh, in the construction of tree-hooks or devices which adapt the chain to be fastened around a tree or object, which will not allow the chain to be thrown over the top of the same, all as hereinafter more fully described.

In the drawing, A represents the lever, to the end of which is securely attached a heavy metal shank, X, which is connected through its fulcrum $a$ with an immovable object. Upon the opposite side of this shank from its connection with an immovable object are pivoted the grabs B B', one upon each side of the fulcrum. Both of these grabs have claws at their extremities opening upon the same side, so as to operate upon the same side of the grab-chain, and to remove one claw from the range of the other, so as not to interfere with each other in their respective movements. The grab B, pivoted near the extremity of the lever, is made much shorter than the other. In pivoting this smaller grab B near the end of the lever, the edges of the metal shank are extended at $b\ b$, Fig. 2, so as to afford a greater bearing-surface for the pivoted ends of the grab, and to re-enforce the end of the shank against any tendency to fracture, the middle portion of the end of the shank between the flanges $b\ b$ being left recessed, to allow the free passage of the grab-chain. The face of the claws of the longer grab is also made more rounding and inclined than the shorter grab, in order to allow the grab to loosen and to slip freely over the tightened chain, while the seat for the chain in the claws of the shorter grab is closer into the shank than in the longer grab.

The object of this last construction is to permit the chain to be brought by the small grab close enough to the larger grab to enable the latter to take hold of the same.

C is the grab-chain, which is formed of single straight sections $c$, pivoted between double sections $c'\ c'$ upon riveted bolts, the narrower part of the chain, as composed of the single section between the double sections, affording notches or spaces in the chain, which give a hold for the claws of the grabs. In constructing this chain the bolts $d$, which connect the links, are made larger in the middle, where they pass through the middle or single link, and at their extremities are milled or reduced in size, where they pass through the outer or double links.

The merit of this arrangement is as follows: In the first place, in riveting the links of the chain, the shoulders of the bolts prevent the outer links from being riveted so tight as to bind against each other and obstruct free movement. Again, the increased diameter of the rivets in the center renders the same stronger and more durable, and prevent any bending or cramping of the rivet-bolts upon the link-sections when the strain is upon the chain.

This form of chain is the one which I consider to be best adapted to the purposes of a stump-puller, and hence I have described it fully. Inasmuch, however, as it is a distinct invention, applicable to other uses, I reserve the right to claim the same as an original invention in a separate application.

At the end of the grab-chain is a hook, $e$, to which is detachably connected, by a bolt, $f$, a swiveling connection, $g$, which prevents the grab-chain from ever becoming twisted, and thus obviates any tendency to break from this cause.

D is the cable-chain or coil-chain, which passes around the stump. To this chain is connected a self-locking lever-fastening. It consists of a lever, $h$, having at one end a cockeye, $k$, through which the chain passes, and at the other end a clevis, $i$, to which the other end of the chain is attached. Now, after the chain is passed around the stump and the lever-fastening adjusted, the strain has a tendency to tilt or cant the lever, and this deflects and cramps the link contained in the eye of the lever, so as to form a secure and self-locking fastening.

In connecting the stump-chain with the swivel of the grab-chain, I employ a rod-chain, E, which consists of sections of rods with intermediate links $j$. This rod-chain is to facilitate the hauling up and shortening of the connection without the necessity of handling a heavy chain.

When the connection is to be shortened, one or more sections of the rod is removed, and the adjustable clevis $l$ connected closer up for a shorter purchase. This clevis $l$, it will be seen is connected, by a bolt, $m$, with a link, $t$, having an eye in the end, which parts are rendered separable by the removal of the bolt.

The hook $e$ of the grab-chain is also designed to be used in some cases for shortening the purchase.

In connecting the fulcrum of the lever with the immovable object, I employ what I term a "spur-clevis," which consists of a clevis, $o$, having its forks pivoted upon opposite sides of the metal shank of the lever to constitute the fulcrum, which metal shank is recessed to receive said forks, and remove the latter from the plane of the movement of the grabs. Said spur-clevis has its outer end tapered, reduced, and perforated, to form an eye, which receives a bolt, $p$, that secures detachably a second clevis, $q$. A cable-chain, F, is made to encircle the stump or tree, which constitutes the immovable object, and this is connected to the detachable clevis by rod-sections G, similar to those before described, E, and adapted to the same use by the separation of the removable clevis from the spur-clevis.

For fastening the cable-chain around a tree where the loop or bight of the chain cannot be passed over the top, a special device, H, is employed for connecting the chain, which I term a "tree-hook." It consists of a metal rod having a hook at one end and a bend in the body portion in the same plane, and a hook at the opposite end, in a plane at right angles to the other, the bend in the body portion conforming to the curvature of the tree, the hook at one end passing through a link, while that at the other end embraces the chain.

After the stump has been started, and speed becomes more desirable than power, the grabs are no longer required, and a separate device is brought into play. This consists of a collar or band, I, which slips up and down on the lever, having an extension upon one side to admit the end of a long hooked rod, $r$, the outer end of which is hooked into the chain lower down, and the stump then more rapidly hauled out upon level ground. By slipping the collar up or down on the lever, varying degrees of power are obtained.

If, moreover, in the operation of starting the stump, the power of the team be found insufficient, a supplemental section, J, may be added to the lever to increase the leverage. In connecting this section a strap-socket, $s$, is secured to the main section of the lever, and the supplemental section is then passed through the clevis $u$ of the main section (which is turned at right angles) and is then seated in the socket. The clevis of the main section, it will be seen, does double duty, in that it both operates as a draft-connection when the supplemental section is not employed, and when it is employed serves as a means of securing the same.

Having thus described my invention, what I claim as new is—

1. The grabs made of different lengths, and having claws upon their extremities opening upon the same side, to adapt them to operate upon the same side of the chain, combined with a lever fulcrumed between the grabs, and with a grab-chain, substantially as described.

2. The short grab B, having its seat for the chain closer in to its shank than the grab B', in combination with the said longer grab, the lever, and the chain, substantially as described.

3. The combination, with the grab-chain C and the cable-chain D, of a rod-chain, E, and a separable or disconnecting clevis-coupling, $l\ m\ t$, arranged at the end of the said rod-chain, substantially as and for the purpose described.

4. The combination, with the cable-chain, of the lever $h$, having a cockeye, adapted to receive the said chain at one end and a pivoted clevis at the other, connected with the end of said chain, substantially as and for the purpose described.

5. The combination, with the anchor-chain and the lever A, of the clevis $o$, having its end reduced and perforated, and a removable clevis secured thereto by a bolt, substantially as described.

6. The metal shank X, recessed at its fulcrum upon both sides, and combined with the clevis and the grabs, to remove the said clevis from range of conflict with the grabs, substantially as described.

7. The collar or band I, arranged about the lever, and adapted to slide thereon, in combination with said lever and a removable rod, $r$, as and for the purpose described.

8. The combination, with the lever A, having a strap-socket, $s$, and a clevis, $u$, of the supplemental section J, arranged in said socket and clevis, substantially as shown and described.

9. The tree-hook consisting of a metal rod having a hook at one end, a bend in the body portion in the same plane, and a hook at the other end at right angles to the first, substantially as shown and described.

The above specification of my invention signed by me this 15th day of March, 1878.

B. F. PRICE.

Witnesses:
CHAS. A. PETTIT,
SOLON C. KEMON.